United States Patent [19]

Luneau

[11] 4,079,278
[45] Mar. 14, 1978

[54] HYBRID FIELD PERMANENT MAGNET MOTOR

[75] Inventor: John R. Luneau, Weston, Mass.

[73] Assignee: Torque Systems Incorporated, Waltham, Mass.

[21] Appl. No.: 610,429

[22] Filed: Sep. 4, 1975

[51] Int. Cl.² ............................................. H02K 15/00
[52] U.S. Cl. .................................................. 310/154
[58] Field of Search ......................... 310/71, 154, 181

[56] References Cited

U.S. PATENT DOCUMENTS

| 3,091,713 | 5/1963 | Latta | 310/154 |
|---|---|---|---|
| 3,258,622 | 6/1966 | Gillespie | 310/154 |
| 3,566,251 | 2/1971 | Hoglund | 310/154 X |
| 3,663,850 | 5/1972 | Phelon | 310/154 X |
| 3,790,830 | 2/1974 | Bonfiglio | 310/154 X |
| 3,831,047 | 8/1974 | Sokol et al. | 310/71 X |

Primary Examiner—Robert K. Schaefer
Assistant Examiner—W. E. Duncanson, Jr.
Attorney, Agent, or Firm—Weingarten, Maxham & Schurgin

[57] ABSTRACT

A permanent magnet servomotor having a split series aiding field adapted for direct connection to an SCR or other switching type drive amplifier and permitting the use of high flux density permanent magnet poles which provide an intended high field strength to accomplish commutation at higher horsepower while being immune from pole demagnetization.

10 Claims, 7 Drawing Figures

HYBRID FIELD PERMANENT MAGNET MOTOR

FIELD OF THE INVENTION

This invention relates to permanent magnet motors, and more particularly to a permanent magnet motor having a hybrid field operative to prevent demagnetization of the permanent magnet poles as a result of armature reaction.

BACKGROUND OF THE INVENTION

Permanent magnet motors and generators are subject to the tendency to permanently demagnetize the permanent magnet field poles as a result of armature reaction. To prevent or minimize such demagnetization, various arrangements of field coils have been proposed heretofore which are in circuit with the armature to provide a cumulative MMF to counteract the demagnetization. One known field compensation technique employs a split series aiding field to cause armature currents to pass through the field with sufficient turns in the field to protect the permanent magnet poles from the demagnetization. Such split series aiding fields are shown, for example, in U.S. Pat. Nos. 3,427,484 and 3,566,251 and German Pat. Nos. 711,343 and 506,984.

For applications in which the motor is part of a bidirectional servocontrol system, the field is usually excited by a switching type drive amplifier such as an SCR amplifier, which provides positive and negative drive signals in accordance with the intended direction of motor rotation. The driving signals may be rapidly switched to provide forward and backward rotation during servo operation and simultaneous application of the positive and negative driving signals can occur which can cause destructive short circuit currents. The driving signals are usually applied to the motor by way of a center tapped inductor which serves to limit the short circuit current in the event of cross firing of the drive amplifier.

SUMMARY OF THE INVENTION

Briefly, the invention provides a permanent magnet servo-motor which achieves relatively high horsepower for a given frame size. The novel motor employs a split series aiding field adapted for direct connection to an SCR or other switching type drive amplifier, the field winding itself providing intended inductance without need for a physically distinct coupling inductor. This series field also permits the use of a high flux density permanent magnet material such as alnico 5, which provides the intended high field strength to accomplish sparkless commutation at higher horsepower by providing substantial or total immunity from pole demagnetization. The poles are composed of a plurality of radially disposed permanent magnets secured in the housing by spring members which also serve to accommodate the field coils comprising the split series field winding. The poles are preferably cast to the desired shape and are employed "as cast" without need for any precision grinding or machining of the pole surfaces. In addition, the poles are maintained by the spring members within the motor housing without need for screws or other fasteners affixed to the motor housing. The novel motor can also be employed for two terminal operation in which mode a pair of semiconductor diodes are preferably mounted within the motor housing and connected to the split field winding.

DESCRIPTION OF THE DRAWINGS

The invention will be more fully understood from the following detailed description taken in conjunction with the accompanying drawings in which.

DETAILED DESCRIPTION OF THE INVENTION

Figure 1:
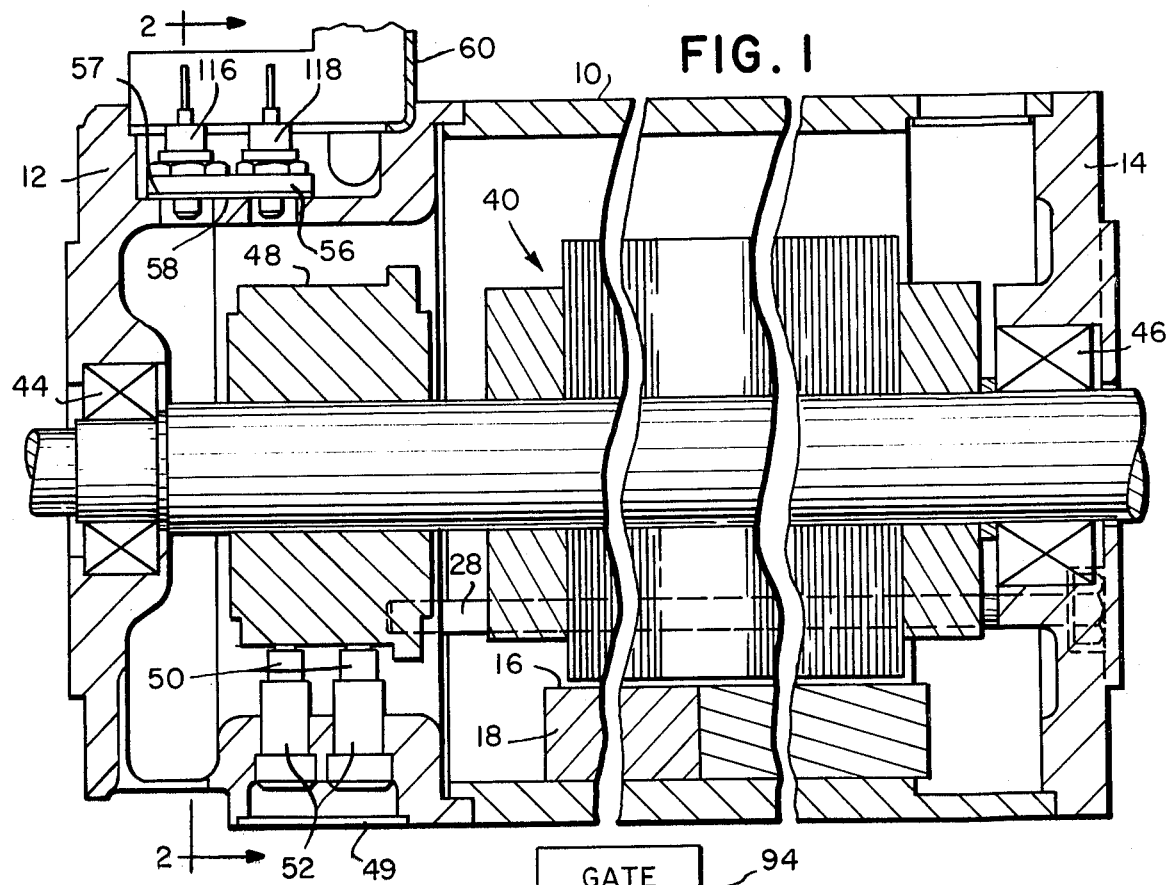
FIG. 1 is a sectional elevation view of a motor according to the invention.
Figure 2:
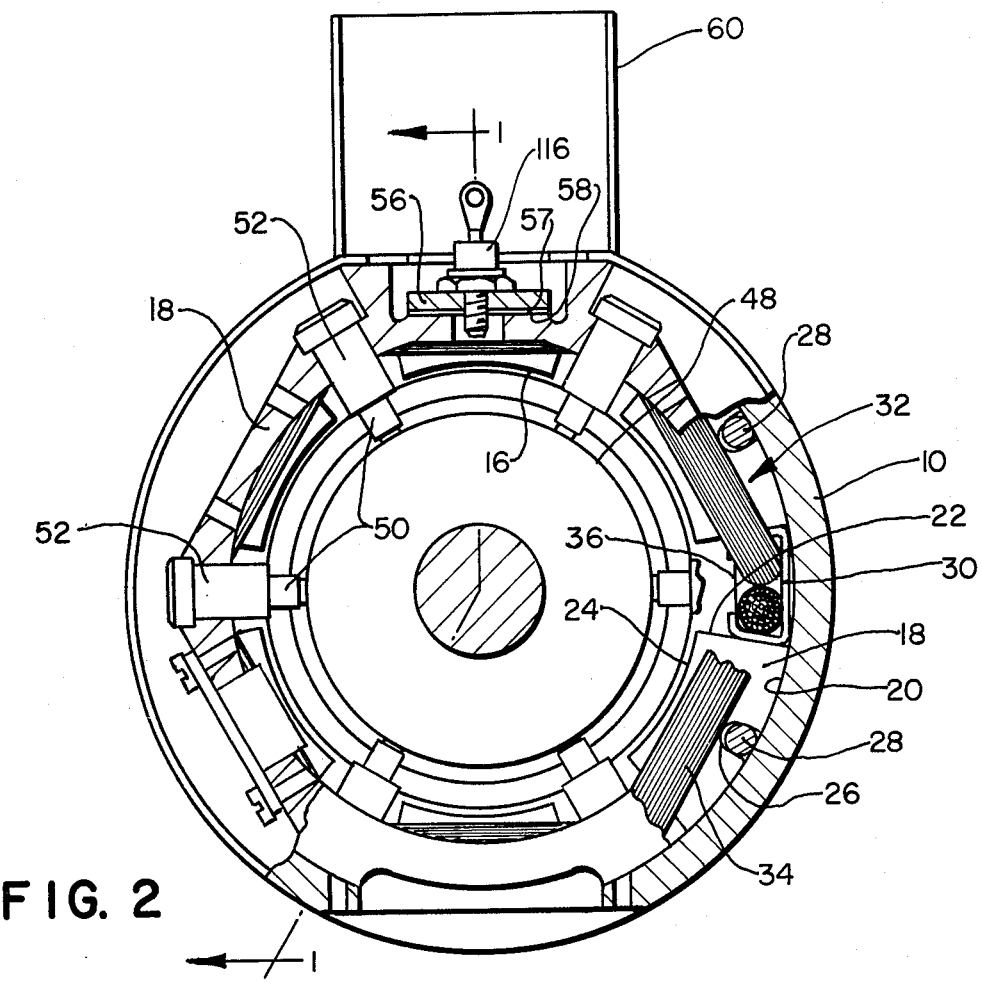
FIG. 2 is a sectional end elevation view of the embodiment of FIG. 1.
Figure 3:
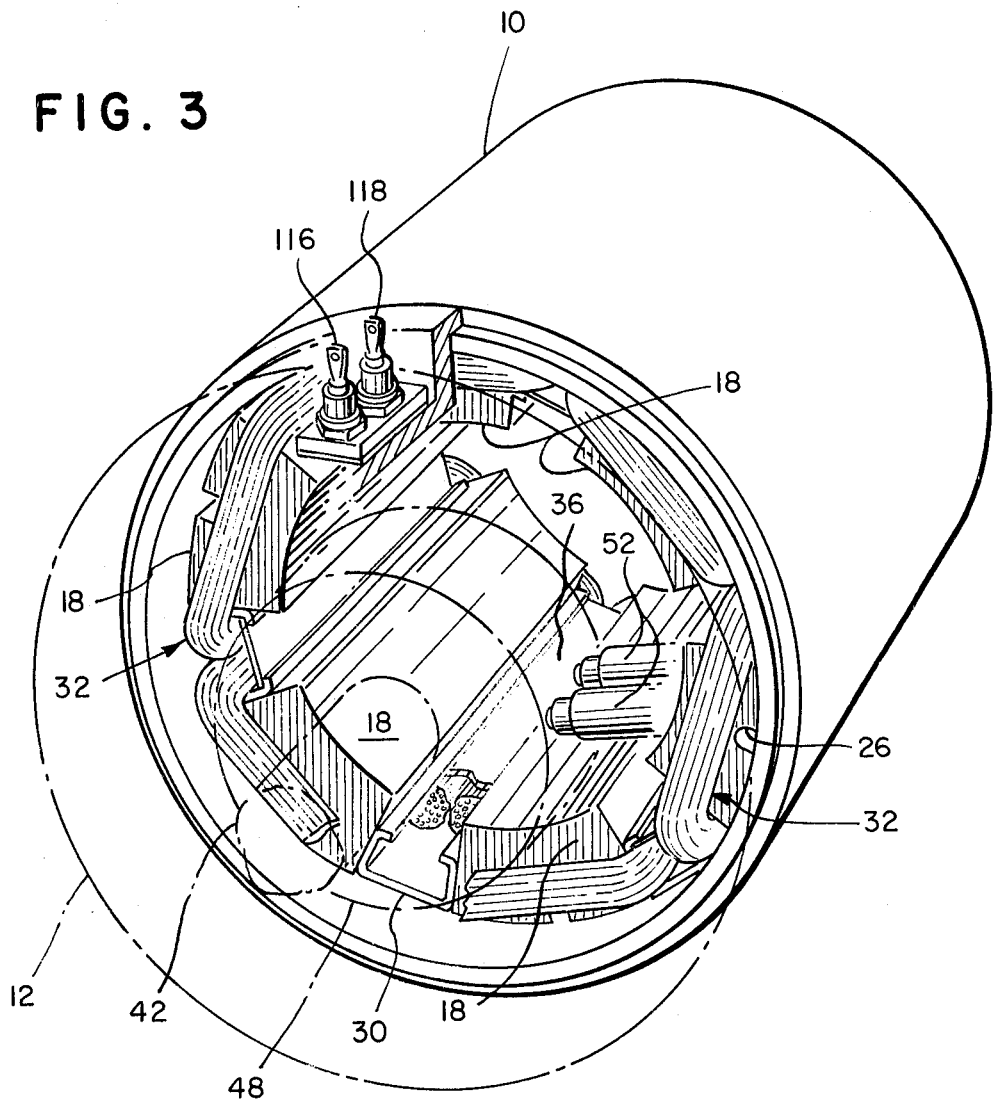
FIG. 3 is a partially cutaway pictorial view of the embodiment of FIG. 1 with the armature removed.

The novel motor is shown in FIGS. 1 through 3 and includes a cylindrical casing affixed to a front end bell 12 and a rear end bell 14 and secured together to form the motor housing. A plurality of permanent magnet poles are supported within casing 10 and are symmetrically disposed about the circumference of the motor casing. The poles 16 are comprised of permanent magnets 18 having an outer surface 20 cylindrically shaped to conform to the confronting wall of casing 10 against which the pole magnet 18 is supported. The magnet includes inwardly tapered side walls 22 which terminate in an inner surface 24 of predetermined curved configuration to define an intended pole face which confronts the motor armature. A longitudinal slot 26 or other opening is provided through magnet 17 to accommodate passage of a through-bolt 28 which secures the end bells 12 and 14 to casing 10.

In the illustrated embodiment each pole 16 is comprised of two magnets 18 mounted end to end along an axis parallel to the motor shaft axis. The pole mounting in casing 10 is accomplished according to the invention without need for bolts or clamps fastened to the motor housing. As seen most particularly in FIG. 2, the magnets 18 defining the poles are circumferentially separated by channel member 30 formed of a spring material and which extends between adjacent poles substantially along the length of the pole magnets. The poles are maintained in intended mounting position by the spring action of channels 30. The channels 30 also serve to accommodate the field windings 32. The field windings include coils 34 installed around respective poles 16 and supported within channels 30 as illustrated. An insulating cover strip 36 can be provided in the open end of channels 30 after installation of field coils 34 to serve as a cover for the coils and to compact the coil twine disposed in the channels to provide efficient heat transfer to the housing. The field coils are electrically connected to provide a split series aiding field as will be further described below.

The armature 40 is supported on motor shaft 42 which in turn is rotatable within bearings 44 and 46 provided in respective end bells 12 and 14. The motor shaft 42 extends out one or both ends of the motor housing for coupling to apparatus to be driven. A commutator 48 is also affixed to and rotatable with shaft 42; a plurality of brushes 50 are provided in operative association with commutator 48. The brushes 50 are supported by a brush assembly 52 supported within openings provided in end bell 12. In the illustrated embodiment twelve brushes are employed equally spaced about the circumference of the motor and arranged in two groups of six brushes, each group being axially displaced from the other for contact with commutator 48 along two circumferential tracks. A cover ring 49 is provided around the brush assemblies by which the brushes are accessible for replacement.

As shown above, the pole megnets are maintained in mounted position by the keystone action of the channels 30. Mounting hardware for the poles as employed in conventional motor construction and which can occupy considerable space within the motor housing is completely eliminated by the present construction, and space within the housing is readily provided for installation of the field windings within the channels 30 also employed to maintain the pole magnets in position. The through-bolts 28 extending through openings 26 in the pole magnets 18 do not interfere with the space needed for accommodation of the field windings. The openings 26 in the pole magnets are provided symmetrically with respect to a radial center line of the magnet, such that the bolt 28 passes through the center line of the magnet at a position adjacent to the interior wall of casing 10. The rotational position of the end bell 12 with respect to the circumferential disposition of the poles 16 is determined by the bolt 28 secured to end bell 12 such that there is no need for rotational adjustment of brushes 50 to provide optimum positioning of the brushes relative the poles.

The magnets 18 are of alnico 5 and are radially oriented magnetically. The magnets are cast to the intended size and shape and are employed "as cast" without need for subsequent precision grinding of any of the magnet surfaces. The manufacturing cost of the permanent magnet poles is therefore significantly less than fabrication of poles of conventional construction requiring precision grinding. The poles are cast to provide optimum pole face configuration to minimize cogging. A minimum air gap is provided at the center of the pole face, the gap increasing toward the tips of the pole face, as is known. The provision of the properly configured air gap without need for grinding or machining of the pole face provides a high performance motor having minimum cogging without need for skewing of the armature laminations as is commonly employed to minimize cogging. The casing 10 of the motor housing serves as a flux return path for the field, as well as the main structural member between the end bells 12 and 14. The magnets 18 are also of tapered configuration to focus the flux and provide a higher flux density and thereby permit a minimum number of armature turns which in turn minimizes armature self-inductance, thereby permitting sparkless commutation at higher horsepower.

Figure 4:
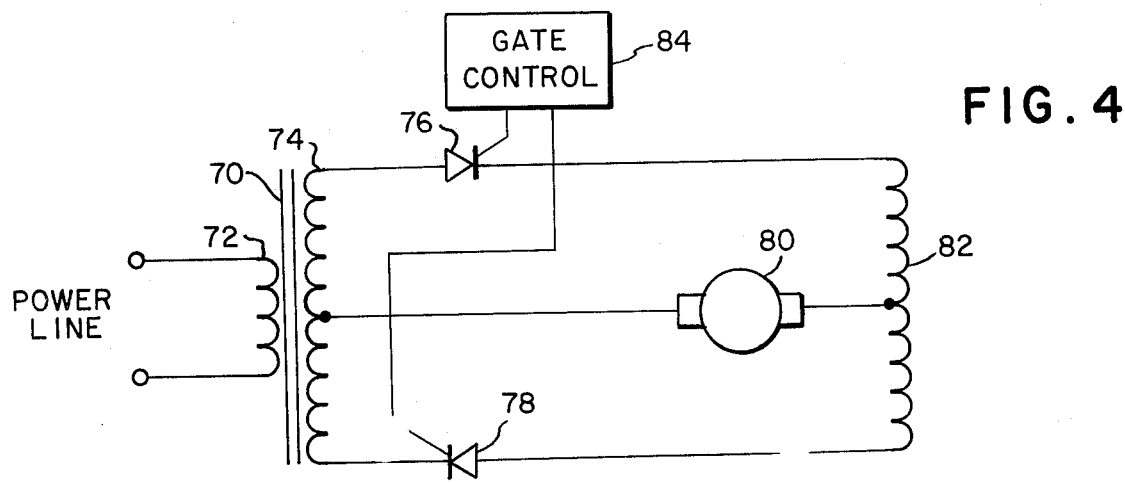
FIG. 4 is a schematic representation of a single phase half wave drive circuit for the novel motor.

The motor is usually connected in a three terminal configuration to an SCR or other switching type drive circuit providing positive and negative driving signals. A single phase half wave drive circuit is shown in FIG. 4 and includes a power transformer 70 having a primary winding 72 connected to a source of AC power and a center tapped secondary winding 74 connected as shown to first and second silicon controlled rectifiers (SCRs) 76 and 78 and with the center tap of winding 74 being connected to one brush terminal of motor 80. The other brush of terminal 80 is connected to the center tap of split series field winding 82, the end terminals of which are coupled respectively to the cathode of SCR 76 and the anode of SCR 78. The gate electrodes of the SCR's 76 and 78 are connected to a gate control circuit 84 which provides triggering of each SCR to provide corresponding rotation of motor 80. In the event of inadvertent cross firing of both SCR's, the inductance provided by field winding 82 limits the magnitude of the short circuit current to prevent destructive currents from being applied to the motor.

Figure 5:
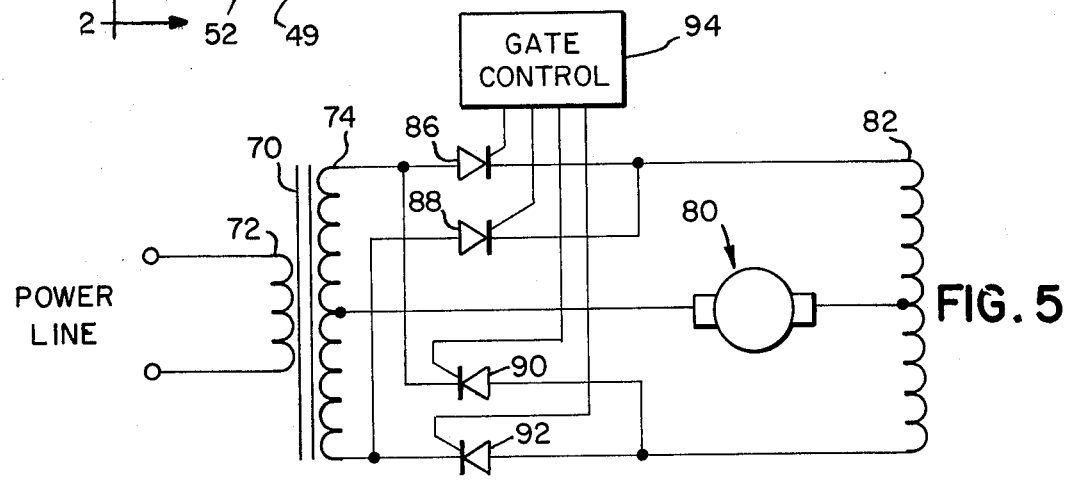
FIG. 5 is a schematic representation of a single phase full wave drive circuit for the novel motor.
Figure 6:
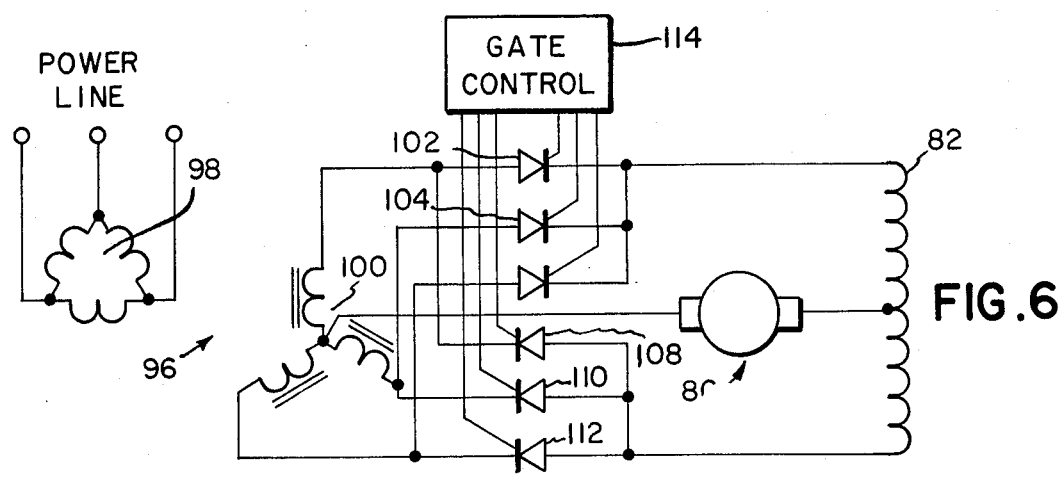
FIG. 6 is a schematic representation of a three phase half wave drive circuit for the novel motor.

An alternative drive circuit of single phase full wave configuration is shown in FIG. 5. In this version, four SCR's 86, 88, 90 and 92 are connected as shown between secondary winding 74 and split field 82, the gate control circuit 94 providing intended triggering of the SCR's. A drive circuit of multiphase configuration can also be employed with the novel motor such as the three phase half wave circuit of FIG. 6. In this latter embodiment, a three phase power transformer 96 is employed having its primary windings 98 connected to a three phase power source, and the secondary windings 100 connected as shown to six SCR's 102–112 triggered by a gate control circuit 114.

Figure 7:
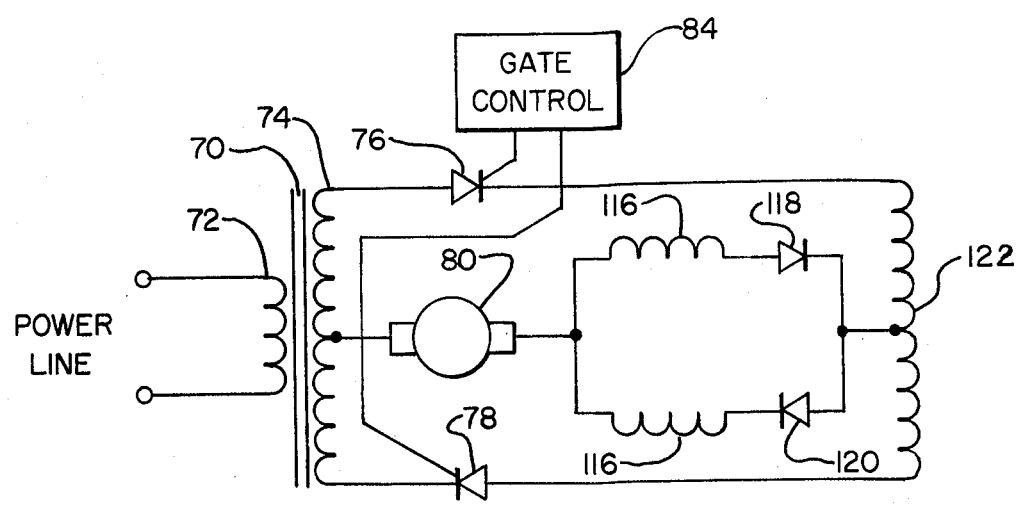
FIG. 7 is a schematic representation of a single phase two terminal drive circuit for the novel motor.

The novel motor is also operative in a two terminal wiring configuration such as shown in FIG. 7. The split field 116 of motor 80 is connected to oppositely poled diodes 118 and 120 which are, in turn, connected to the center tap of an inductor 122. The end terminals of inductor 122 are connected to respective SCR's 76 and 78. It will be appreciated that the drive circuit is similar to that shown in FIG. 4, except that in FIG. 7, the driving signals are applied via an inductor 122 to the split field 116 and its associated diodes. The inductor is employed on this two terminal driving configuration to limit short circuit currents which can occur upon inadvertent cross firing of SCR's 76 and 78.

When the motor is employed in a two terminal mode, the semiconductor diodes preferably are mounted in the motor housing and are internally connected to the split field. Referring again to FIGS. 1-3, the diodes 116 and 118 are mounted on an electrically and thermally conductive plate 56 which in turn is affixed to a mounting surface 58 provided in end bell 12 by means of an electrically insulative thermally conductive spacer 57. The spacer 57 is typically mica or ceramic. A junction box 60 is affixed to end bell 12 around the mounting area of diodes 116 and 118 within which electrical connection is made to the diodes and to the armature. The mounting plate 56, spacer 57 and associated portion of end bell 12 serve as an efficient heat sink for the diodes as well as providing ready accessibility for connection or replacement of the diodes.

It will be appreciated that the novel motor structure can be implemented in various sizes and configurations to suit particular operating requirements. The novel structure is also useful as a permanent magnet generator. Accordingly, it is not intended to limit the invention by what has been particularly shown and described except as indicated in the appended claims.

What is claimed is:

1. A DC motor comprising:
    a housing;
    a plurality of permanent magnet poles disposed in said housing;
    a plurality of elongated spring members, each disposed between a pair of adjacent magnet poles and operative to maintain said poles in predetermined position within said housing, said spring members providing elongated channels between adjacent ones of said poles and extending parallel to the motor axis, said channels providing space within said housing for field coils;

an armature disposed within said poles and mounted on said housing for rotation with respect to said housing and said poles;

said housing providing a flux return path for said permanent magnet poles; and a plurality of field coils, each disposed around a respective permanent magnet pole and having sides disposed in respective channels of said spring members;

said field coils being connected in split series connection to provide a split series aiding field winding.

2. A DC motor according to claim 1 including solid state control means mounted for thermal dissipation on said housing and electrically connected to said split series field.

3. A DC motor according to claim 1 wherein said field winding includes first and second terminals adapted for connection to a switching type drive amplifier.

4. A DC motor according to claim 3 wherein said field winding provides sufficient inductance to limit destructive short circuit currents in the event of cross firing of said switching type drive amplifier.

5. A DC motor according to claim 1 wherein said permanent magnet poles each include a precast permanent magnet having an arcuate pole face of predetermined surface configuration, an opposite surface of cylindrical configuration conforming to the confronting wall of said housing, and first and second side walls inwardly tapered toward and terminating at said pole face, said pole face and confronting armature defining a gap of smallest dimension at the center of said pole face and of increasing dimension toward the tips thereof.

6. A DC motor comprising:
a housing
a plurality of permanent magnet poles disposed in said housing and each including:
a precast permanent magnet having an arcuate pole face of predetermined surface configuration, an opposite surface of cylindrical configuration conforming to the confronting wall of said housing, and first and second side walls inwardly tapered toward and terminating at said pole face, said pole face and confronting armature defining a gap of smallest dimension at the center of said pole face and of increasing dimension toward the tips thereof; and
an opening extending through the magnet in a direction parallel to the motor axis;
a plurality of elongated spring members, each disposed between a pair of adjacent magnet poles and operative to maintain said poles in predetermined position within said housing, said spring members providing elongated channels between adjacent ones of said poles and extending parallel to the motor axis;
an armature disposed within said poles and mounted on said housing for rotation with respect to said housing and said poles;
said housing providing a flux return for said permanent magnet poles; and
a plurality of field coils, each disposed around a respective permanent magnet pole and having sides disposed in respective channels of said spring members;
said field coils being connected in split series connection to provide a split series aiding field winding;
said housing including:
a cylindrical casing and first and second end bells cooperative therewith, each of said end bells having bearing means for rotational support of said armature; and
a plurality of through bolts, each adapted for passage through a respective opening in corresponding ones of said permanent magnets for securing said end bells to said casing.

7. A DC motor according to claim 6 further including a plurality of insulating strips, each disposed within a respective channel of a corresponding spring member and operative to compact the turns of the field coil disposed in said channel to provide efficient heat transfer to said housing.

8. A DC motor according to claim 6 wherein one of said end bells supports brush means in electrical cooperation with said armature;
and wherein said through bolts secure said end bell with respect to said housing to provide intended alignment of said brush means with respect to said poles.

9. A DC motor according to claim 7 wherein one of said end bells includes a plurality of brushes supported for contact of the commutator of said armature;
a junction box on said end bell within which electrical connection is made to said armature.

10. A DC motor comprising:
a housing;
a plurality of permanent magnet poles disposed in said housing;
a plurality of elongated spring members having inwardly extending end portions, each spring member disposed between a pair of adjacent magnet poles and operative to maintain said poles in predetermined position within said housing, said spring members providing elongated channels between adjacent ones of said poles and extending parallel to the motor axis, said channels providing space within said housing for field coils;
an armature disposed within said poles and mounted on said housing for rotation with respect to said housing and said poles;
said housing providing a flux return path for said permanent magnet poles; and
a plurality of field coils, each disposed around a respective permanent magnet pole and having sides disposed in respective channels of said spring members;
said field coils being connected in split series connection to provide a split series aiding field winding;
a plurality of insulating strips, each disposed within a respective channel of a corresponding spring member and operative to compact the turns of the field coil disposed in said channel to provide efficient heat transfer to said housing, said strips securely held in respective channels by said inwardly extending end portions.

* * * * *

UNITED STATES PATENT AND TRADEMARK OFFICE
CERTIFICATE OF CORRECTION

PATENT NO. : 4,079,278
DATED : March 14, 1978
INVENTOR(S) : John R. Luneau

It is certified that error appears in the above-identified patent and that said Letters Patent are hereby corrected as shown below:

Column 1, line 33, "provide forward" should read --provide intended forward--.

Column 5, line 64, "return for" should read --return path for--.

Signed and Sealed this

Eighth Day of August 1978

[SEAL]

Attest:

RUTH C. MASON
Attesting Officer

DONALD W. BANNER
Commissioner of Patents and Trademarks